United States Patent
Pastor Nigorra et al.

(10) Patent No.: US 11,682,779 B2
(45) Date of Patent: Jun. 20, 2023

(54) FUEL CELL FREEZE START METHOD WITH ANODE PRESSURE CONTROL

(71) Applicant: cellcentric GmbH & Co. KG, Kirchheim unter Teck (DE)

(72) Inventors: Pere Antoni Pastor Nigorra, Tuebingen (DE); Sven Schmalzriedt, Esslingen (DE); Richard Fellows, Vancouver (CA); Laura Iwan, Burnaby (CA)

(73) Assignee: Cellcentric GMBH & Co. KG, Kirchheim unter Teck (DE)

( * ) Notice: Subject to any disclaimer, the term of this patent is extended or adjusted under 35 U.S.C. 154(b) by 0 days.

(21) Appl. No.: 16/954,707

(22) PCT Filed: Nov. 29, 2018

(86) PCT No.: PCT/EP2018/083011
§ 371 (c)(1),
(2) Date: Jun. 17, 2020

(87) PCT Pub. No.: WO2019/120927
PCT Pub. Date: Jun. 27, 2019

(65) Prior Publication Data
US 2020/0388866 A1   Dec. 10, 2020

(30) Foreign Application Priority Data
Dec. 18, 2017   (DE) .................... 10 2017 011 925.2

(51) Int. Cl.
*H01M 8/04225*   (2016.01)
*H01M 8/04223*   (2016.01)
(Continued)

(52) U.S. Cl.
CPC ..... *H01M 8/04253* (2013.01); *H01M 8/0491* (2013.01); *H01M 8/04302* (2016.02);
(Continued)

(58) Field of Classification Search
None
See application file for complete search history.

(56) References Cited

U.S. PATENT DOCUMENTS

| 7,867,642 B2 | 1/2011 | Falta |
| 9,005,830 B2 | 4/2015 | Goebel et al. |

(Continued)

FOREIGN PATENT DOCUMENTS

| CN | 1732586 | 2/2006 |
| CN | 1922750 | 2/2007 |

(Continued)

OTHER PUBLICATIONS

English translation of DE102011010482B4 (Year: 2011).*

(Continued)

*Primary Examiner* — Lucas J. O'Donnell
(74) *Attorney, Agent, or Firm* — Sheridan Ross P.C.

(57) ABSTRACT

A method for starting a fuel cell in a fuel cell system, at temperatures below the freezing point of water, includes, in a first step, that the hydrogen concentration in the anode is increased; after which, in a second step, an anode pressure is increased for a fixed period of time, and while air is supplied to the cathode, the maximum possible current is drawn from the fuel cell, and after which, in a third step, the fuel cell is switched in a load-free manner and the anode pressure is reduced. After the third step, the second step and the third step are repeated successively until a sufficient performance of the fuel cell for its normal operation is reached.

7 Claims, 1 Drawing Sheet

(51) Int. Cl.
*H01M 8/04302* (2016.01)
*H01M 8/04746* (2016.01)
*H01M 8/04791* (2016.01)
*H01M 8/04858* (2016.01)

(52) U.S. Cl.
CPC ... *H01M 8/04753* (2013.01); *H01M 8/04798* (2013.01); *H01M 2250/20* (2013.01)

(56) References Cited

U.S. PATENT DOCUMENTS

| | | | |
|---|---|---|---|
| 2004/0013915 | A1 | 1/2004 | Matsuoka |
| 2004/0247965 | A1 | 12/2004 | Resnick et al. |
| 2005/0238934 | A1* | 10/2005 | Takahashi ............ H01M 8/0494 429/414 |
| 2009/0311560 | A1 | 12/2009 | Lee et al. |
| 2010/0143813 | A1 | 6/2010 | Goebel et al. |
| 2011/0097637 | A1* | 4/2011 | Ko .................... H01M 8/04231 429/429 |
| 2017/0324101 | A1* | 11/2017 | Sinha .................... H01M 8/045 |

FOREIGN PATENT DOCUMENTS

| | | |
|---|---|---|
| CN | 102163724 | 8/2011 |
| DE | 10 2007 050 856 A1 | 5/2008 |
| DE | 10 2007 033 429 A1 | 1/2009 |
| DE | 10 2008 060 534 A1 | 6/2010 |
| DE | 10 2011 010 482 A1 | 3/2012 |
| DE | 10 2015 225 507 A1 | 11/2016 |

OTHER PUBLICATIONS

PCT/EP2018/083011, International Search Report dated Feb. 12, 2019 (Two (2) pages).
Official Action (with English translation) for China Patent Application No. 2018800812227, dated Sep. 14, 2022, 11 pages.

* cited by examiner

FUEL CELL FREEZE START METHOD WITH ANODE PRESSURE CONTROL

BACKGROUND AND SUMMARY OF THE INVENTION

The invention relates to a method for starting a fuel cell in a fuel cell system at temperatures below the freezing point of water.

Starting a fuel cell under such conditions is also referred to as a freeze start or "Freeze Start" or "Freeze Start Up". Here, there are various way of implementing such a freeze start for fuel cells. Often, it is simply that the fuel cell is heated directly or indirectly via the cooling medium. A combustion device or an electrical heating device can be provided for this purpose, for example. In this context, reference can be made to US 2004/0247965 A1 or DE 10 2008 060 534 A1, for example. In another document, US 2004/0013915 A1, it is proposed to use the fuel cell for heating in reverse, i.e., as an electrolyzer. The disadvantage of such a design is that additional energy or additional components are always required and that this leads to a correspondingly high complexity of the system in terms of its design and with regard to its control.

Further alternative possibilities are to prepare the fuel cell accordingly before restarting it, for example to dry it out as much as possible in the scope of a shutdown procedure in order to prevent water from being present which could freeze. This is also correspondingly complex and time-consuming in application. In addition, drying out is rather disadvantageous for the membranes of a fuel cell designed as a PEM fuel cell, for example, and has a negative effect on the service life.

An alternative is to heat up the fuel cell system by putting it into operation and by producing electricity depending on the possible cell load, DE 10 2007 050 856 A1, for example, describes the operation of the fuel cell system with an optimized current density-time progression. DE 10 2007 033 429 A1 goes in a similar direction and describes the additional electrical load on the fuel cell, for example via a system compressor.

These latter methods are problematic here, since the operation of a single cell blocked with ice within the fuel cell, which is typically constructed as a stack of single cells, leads to damage to the latter. Although this can be prevented or to a certain extent contained by additional measures such as special catalysts or a very complex monitoring of the cell voltages of all individual cells, this makes the construction extremely elaborate and complex, again both in terms of design and assembly and also with regard to the control.

The object of the present invention is therefore to specify an improved method for starting the fuel cell of a fuel cell system at temperatures below the freezing point of water.

In the method according to the invention, it is provided that in a first step before the actual freezing start of the fuel cell, the hydrogen concentration in the anode is increased. This increase in the hydrogen concentration in the anode can be carried out until the hydrogen emissions permitted in the exhaust gas are reached. These should not be exceeded in accordance with an advantageous development of the idea. Here, a further very advantageous design of the idea provides that in this first step, hydrogen concentrations of more than 90%, preferably more than 95% and particularly preferably more than 98%, are aimed for.

The actual freezing start then takes place in a second and third step, which are repeated iteratively until the fuel cell has reached its full performance capability. In the second step, the anode pressure is increased for a defined period of time and the maximum possible current is drawn from the fuel cell when air is supplied to the cathode. The third step is then carried out after a defined period of time. In this third step, the fuel cell is switched load-free and the anode pressure is lowered in order to be able to increase it again at the beginning of the second step which is started again afterwards. The second and third steps are repeated several times, in particular until the full performance capability of the fuel cell is guaranteed, such that it can be operated in normal mode or can continue to be operated in a quasi-normal mode until the starting process of the entire fuel cell system is completed.

The method according to the invention allows a very simple and efficient freeze start of the fuel cell. In this way, it is in particular possible to simplify the design of the fuel cell, since no or much less consideration must be given to potential blockage by frozen water when designing the individual cells, and here in particular the gas-conducting channels. In addition, the expenditure required for freeze start preparation of the fuel cell system, in particular through drying and heating procedures when the fuel cell system is switched off, as mentioned at the beginning, can be reduced or eliminated. This results in decisive advantages for practical use, in particular if the fuel cell system is used in a vehicle, since frequent changes between operating phases and switched-off phases occur here, and since it can never be ruled out that vehicles may be switched off at temperatures below the freezing point of water and must then be able to start again.

Particularly favorable design of the method according to the invention provides that the change of the anode pressure is achieved by a combined control or regulation of the hydrogen dosage on the one hand and a discharge valve for media in the anode on the other hand. Such a discharge valve can, for example, be present in an anode recirculation around the anode of the fuel cell in order to blow off accumulations of inert gases such as nitrogen and water or water vapour from the anode area or the anode circuit, depending on concentrations or time. It is often referred to as a purge valve, corresponding to its English designation Purge Valve. A combination of the control of this discharge valve and the control of the hydrogen dosage on the other hand allows the adjustment of the anode pressure and finally also the hydrogen concentration in the anode region.

At the beginning of the starting procedure, it may be necessary to replace nitrogen, which has accumulated in the anode during a longer standstill phase, with the hydrogen in order to start at all. For this purpose, the dosing must be opened accordingly and the discharge valve must also be open. In order to increase the pressure, the discharge valve can be fully or partially closed while the dosing remains open, such that the anode pressure and indirectly the hydrogen concentration in the anode can be influenced by combining these two possibilities.

A very advantageous development of this provides that before the first step, the anode pressure is increased and the function of the discharge valve is checked. Before the freeze start procedure is initiated with the first step described above, the anode pressure can therefore be increased, in particular by opening the dosing valve while the discharge valve remains closed. If this is then opened, the anode pressure must be reduced accordingly such that the functionality of the discharge valve can be checked.

As already mentioned, the hydrogen concentration should be increased in the first step, according to an advantageous development with the open discharge valve, until permissible emission limits for hydrogen in the exhaust gas are reached.

A further very favorable design of the method according to the invention provides that no further supply of hydrogen occurs during the third step, in which the fuel cell is switched in a load-free manner and the anode pressure is lowered, in order to enable the anode pressure to drop as quickly as possible, which is then built up again in the subsequently carried out second step of the method.

A particularly advantageous design also provides that the air supply is reduced in the third step compared to the air supply in the second step. Such a reduction of the air supply in the third step saves energy in the region of the air conveyor system and is not necessary anyway due to the reduction or shut-off of the hydrogen dosage and the non-adjacent load.

Similarly, it can be provided in a further design that during the first step, the air supply occurs at a lower level than in the subsequent second step. Also in this first step, in which the hydrogen concentration on the anode side is increased, an air supply can already take place. However, it is not necessary to convey such a large volume as in the following step, in which the maximum possible load is drawn from the fuel cell.

In accordance with another advantageous design, it is also provided that while the anode pressure is increased before the first step, i.e., to check the discharge valve, no air supply takes place. In this phase, no air supply is necessary yet, such that the energy required for this can be saved completely.

Here, the dosing of hydrogen into the anode can be designed in any way. In the above-mentioned exemplary embodiment having an anode recirculation, this can occur in particular via a gas jet pump as a recirculation conveyor. Here, it is provided in accordance with an advantageous design of the method that the dosing of the hydrogen into the anode takes place in a pulsating manner. Such a pulsating dosing of hydrogen into the anode is often used in normal operation in order to better discharge water from the region of the anode and thus to be able to evenly supply the entire surfaces of the individual cells of the fuel cell with hydrogen. Such a pulsating dosing can also be useful for the freeze start procedure, such that this can also already occur during this, such that no alternative or supplementary methods of dosing need to be provided during the steps of the method.

Further advantageous designs of the method according to the invention also arise from the exemplary embodiment, which is described in more detail below with reference to the Figures.

DETAILED DESCRIPTION OF THE DRAWINGS

Figure 1:
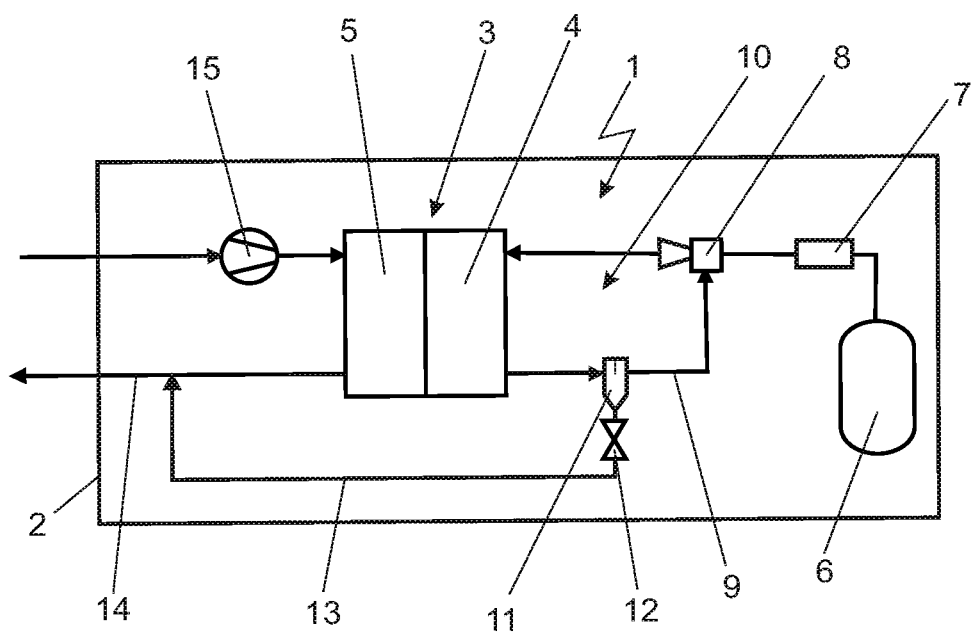
FIG. 1 shows a fuel cell system specified in principle in a schematically depicted vehicle.

In the depiction of FIG. 1, a fuel cell system 1 can be seen in a highly schematized way in a vehicle 2 specified in an even more schematized way. The fuel cell system 1 is to provide electrical drive power there. Such a fuel cell system 1, as depicted here as an example, is known in principle by the person skilled in the art. For this reason, the functionality and the individual components are only briefly described below.

A fuel cell 3 forms the core of such a fuel cell system 1, the fuel cell typically being designed as a stack of individual cells, a so-called fuel cell pile or fuel cell stack. In the depiction of FIG. 1, a common anode 4 and a common cathode 5 of this fuel cell 3 is shown, for example. The anode 4 is supplied with hydrogen from a compressed gas storage 6. Via a pressure regulating and dosing valve 7 and in the exemplary embodiment depicted here, a gas jet pump 8, also referred to as an injector, the hydrogen reaches the anode 4. Unused hydrogen, together with inert gases and part of the product water from the anode 4, returns via a recirculation line 9 to the gas jet pump 8 and is sucked in by the latter, wherein the fresh hydrogen from the compressed gas storage 6 serves as the propulsive jet. Alternatively or in addition, a blower for conveying the recirculated anode exhaust gas would also be conceivable here.

From this inherently known so-called anode circuit 10, gas and water are discharged from time to time or as a function of, for example, a concentration of nitrogen in the anode circuit 10 via a water separator 11 and a discharge valve 12, also known as a purge valve. Via an exhaust pipe 13, this discharged exhaust gas passes, for example, into an exhaust pipe 14 from cathode 5 of the fuel cell 3 and is thus diluted with the exhaust air from cathode 5 and released into the surroundings. This dilution makes sense because hydrogen emissions occur in the exhaust gas from the exhaust pipe 13, which can be diluted by the exhaust air to such an extent that they only represent non-critical emissions during normal operation.

The cathode 5 is supplied with air as an oxygen supplier. For this purpose, an air conveyor 15 is used, which can be designed as a flow compressor, for example. Often, this air conveyor 15 is also connected to an exhaust air turbine in the exhaust pipe 14 in order to recover pressure energy from the system and use it to drive the air conveyor 15. This is also not depicted here to simplify the illustration. Likewise, a depiction of a humidifier for the supply air is also omitted.

In practice, it is now the case that liquid product water is produced inside the fuel cell during the electrochemical conversion of hydrogen and oxygen to electrical energy. This product water is very pure and will therefore typically freeze when the freezing point of water within fuel cell 3 is reached. During operation this is not an issue, as the typical temperature of the fuel cell 3 is in the range of 70° C. to 100° C. If, however, fuel cell system 1 is switched off, and in ambient conditions which have temperatures below freezing point, as is unavoidable in particular in a vehicle 2, then the water in fuel cell 3 can freeze. When the vehicle 2 or its fuel cell system 1 is restarted, it must then be ensured that the fuel cell 3 can be put into operation as quickly as possible and is treated as carefully as possible in order not to reduce the service life of the fuel cell 3 unnecessarily. At the same time, the process should be simple and efficient and should be able to forgo complex constructive measures and, for example, highly resistant catalyst components or correspondingly large quantities of catalyst. For this reason, the method described below is used for a so-called freeze start of the fuel cell system 1.

Figure 2:
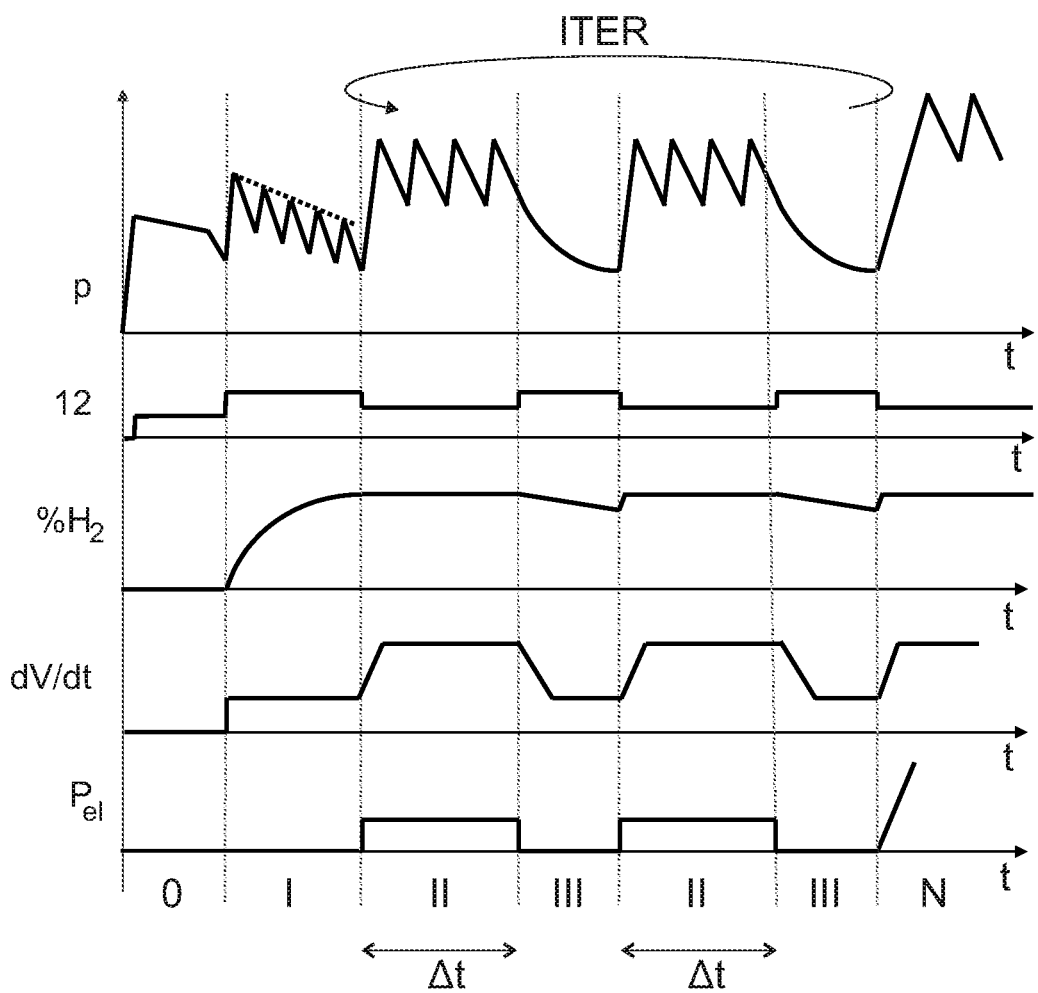
FIG. 2 is a state diagram of quantities relevant to the method according to the invention over time during the method according to the invention.

In the depiction of FIG. 2, a diagram of different variables within the fuel cell system 1 over time t is depicted. From top to bottom, these are firstly the anode pressure p in anode 4 of the fuel cell 3. Second from the top, the position of the discharge valve 12 is depicted accordingly. Third from the top, the hydrogen concentration % $H_2$ is again applied in the anode 4 or the anode circuit 10. Fourthly, the volume flow of air dV/dt, which is conveyed by the air conveying device 15, is applied. At the very bottom, the electrical power $P_{el}$ taken from the fuel cell 3 is also shown. Below the lowest time axis t, various sections of the method are also marked with 0, N and the Roman numerals I, II, III, which will be explained in more detail later.

Before the actual method starts, it is checked within a first period of time marked 0 whether the discharge valve 12 is functional. For this purpose, the anode pressure is increased, for example by dosing hydrogen via the pressure control and dosing device 7 when the drain valve 12 is first closed. The discharge valve 12 is then partially opened and the anode pressure p must drop accordingly. If it does not do so, it must be assumed that the discharge valve 12 is malfunctioning, i.e., it is frozen. This would first have to be remedied, for example, by defrosting the discharge valve 12 by means of electrical heating of the valve or similar.

If the discharge valve 12 is functioning correctly, as indicated in the depiction of FIG. 2, then in a first step I of the freeze start procedure, still before the actual freeze start of the fuel cell 3, the hydrogen dosage is opened in order to fill the anode 4 with hydrogen and to discharge air or nitrogen remaining in the anode 4 from the standstill phase of the fuel cell system 1 into the surroundings via the then open discharge valve 12. The anode pressure p behaves here as indicated in the depiction. The individual prongs come from a typically used pulsating dosing of the hydrogen, which is typically used for normal operation in particular due to the resulting advantages. In principle, it would also be conceivable to dispense with this pulsating hydrogen dosage. Then the anode pressure p indicated by the dotted line in the first method step would arise. As can be seen by the concentration % $H_2$, the hydrogen concentration in anode 4 increases accordingly during this time, in particular as far as is possible on the basis of the permissible emission limits. At the same time, the air conveying device 15 is already in operation, such that a certain air flow dV/dt flows, which in particular also serves to dilute the exhaust gas from the anode 4 accordingly. In the ideal case, hydrogen concentrations of more than 98% are now achieved in the anode 4 at the end of the first method step I.

In the second method step II, which then follows, the actual freezing start is carried out by loading the fuel cell 3 with the maximum possible current in a design possibility with a reduced opening of the discharge valve 12 and increased volume flow dV/dt of the air conveyor 15, such an electrical power $P_{el}$ is drawn from the fuel cell 3, as can be seen in the diagram in FIG. 1 at the very bottom. The reduced opening of the discharge valve 12 can be carried out particularly advantageously in a PWM process, wherein the position of the discharge valve 12 generally results from the selected combination of volume flow dV/dt and pressure p. This situation is maintained for a predetermined time period Δt. Various methods can be used to determine the time period Δt, apart from a pure time determination, such as reaching a temperature threshold, a predetermined current conversion (integral of current over time) but also others.

Then in the third method step III, the electrical power $P_{el}$ is reduced by switching off the current, at the same time the hydrogen dosage is switched off and the discharge valve 12 is opened further. This results in a drop in the anode pressure p, while at the same time the volume flow dV/dt of the air is reduced. The hydrogen concentration % $H_2$ is also reduced because the hydrogen is no longer dosed when the discharge valve is open.

Following this third method step III, the anode pressure p is then increased again, the supplied volume flow of air dV/dt is increased again and the dosing for the hydrogen is opened again such that the concentration % $H_2$ of hydrogen also increases accordingly. All this takes place again with a reduced opening of the discharge valve 12 and the maximum current which can be drawn from the fuel cell 3, such that a corresponding electrical load $P_{el}$ is set again. This method step is again the second method step II. It is then followed, as can be seen in the diagram, by the reduction of the anode pressure in the third method step III. The method steps II and III are therefore each run through twice in the diagram. In practice, a corresponding iteration takes place here, such that these method steps II and III are run through again and again for a longer period of time until the performance of the fuel cell is given. This is indicated accordingly by the oval-shaped arrow ITER above the sections II and III in the diagram of FIG. 2. Once the fuel cell has reached normal performance, this iteration is ended, the freezing start is thus quasi finished and the fuel cell can be operated in the desired manner in its normal mode N, which is indicated on the rightmost section of the time axis t.

In this connection, for example, reaching a temperature limit can be used as the main criterion for determining the performance of the fuel cell. However, other possibilities for determining the performance of the fuel cell can also be considered, for example, simply a maximum number of iterations, a total amount of energy, a current integral, a sufficient polarization curve or many others.

Due to the repeated alternation between short-term load and subsequent reduction of the anode pressure, a freeze start of the fuel cell 3 of the fuel cell system 1 is possible without the need for complex and elaborate additional components and/or an elaborate individual cell monitoring or the like. Thus, constructive and procedural measures to improve the freeze start capability of the fuel cell can be reduced or such measures can be dispensed with completely, making the operation simple, efficient, energy-saving and making the design small, light and cost-effective.

The invention claimed is:

1. A method for starting a fuel cell in a fuel cell system at a temperature below a freezing point of water, comprising the steps of:
   increasing a hydrogen concentration in an anode in a first step;
   following the first step, increasing an anode pressure for a fixed period of time and, while air is supplied to the cathode, drawing a maximum possible current from the fuel cell in a second step;
   following the second step, switching the fuel cell in a load-free manner and reducing the anode pressure in a third step; and
   following the third step, repeating the second step and the third step consecutively until the fuel cell reaches a predetermined performance level for operation above the freezing point of water,
   wherein the increasing of the hydrogen concentration in the first step is performed while the anode pressure decreases during the first step with the discharge valve open until a predetermined emission limit for hydrogen in an exhaust gas is reached, and
   wherein, during the first step, air supplied to the cathode takes place at a lower level than during the second step.

2. The method according to claim 1, wherein a change of the anode pressure is achieved by a combined control or regulation of a hydrogen dosage and a discharge valve for media from the anode.

3. The method according to claim 2, wherein, before the first step, the anode pressure is increased and a function of the discharge valve is checked.

4. The method according to claim 1, wherein, during the third step, no hydrogen is supplied into the anode.

5. The method according to claim 1, wherein, during the third step, air supplied to the cathode is reduced compared to the air supplied to the cathode in the second step.

6. The method according to claim 3, wherein, while the anode pressure is increased before the first step, no air is supplied to the cathode.

7. The method according to claim 1, wherein dosing of hydrogen into the anode takes place in a pulsating manner.

\* \* \* \* \*